US012585665B1

(12) United States Patent
Gudla et al.

(10) Patent No.: US 12,585,665 B1
(45) Date of Patent: Mar. 24, 2026

(54) USING MACHINE-LEARNING MODEL TO GENERATE A USER INTERFACE WITH PERSONALIZED COMBINED FILTERS FOR SEARCH RESULTS

(71) Applicant: Maplebear Inc., San Francisco, CA (US)

(72) Inventors: Vinesh Reddy Gudla, South San Francisco, CA (US); Manmeet Singh, Santa Clara, CA (US); Tejaswi Tenneti, San Carlos, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/951,393

(22) Filed: Nov. 18, 2024

(51) Int. Cl.
*G06F 16/248* (2019.01)
*G06F 16/2457* (2019.01)

(52) U.S. Cl.
CPC ...... *G06F 16/248* (2019.01); *G06F 16/24578* (2019.01)

(58) Field of Classification Search
None
See application file for complete search history.

(56) References Cited

U.S. PATENT DOCUMENTS

| | | | | |
|---|---|---|---|---|
| 10,242,112 | B2 * | 3/2019 | MacGillivray | G06F 16/9535 |
| 10,474,741 | B1 * | 11/2019 | Garg | G06F 16/955 |
| 10,565,262 | B2 * | 2/2020 | Lobo | G06F 16/285 |
| 10,565,639 | B1 * | 2/2020 | Ghamsari | G06F 16/90332 |
| 10,909,156 | B2 * | 2/2021 | Lin | H04L 51/216 |
| 10,984,181 | B2 * | 4/2021 | Garg | G06F 16/248 |
| 11,379,227 | B2 * | 7/2022 | Rao | G06F 16/2453 |
| 11,501,255 | B2 * | 11/2022 | Mann | G06F 16/958 |
| 12,235,853 | B1 * | 2/2025 | Tan | G06F 16/24578 |
| 12,346,322 | B1 * | 7/2025 | Weigand | G06F 16/24542 |
| 2017/0357733 | A1 * | 12/2017 | Lobo | G06F 16/285 |
| 2020/0257849 | A1 * | 8/2020 | Garg | G06F 16/955 |
| 2020/0364182 | A1 * | 11/2020 | Threlkeld | G16H 15/00 |
| 2021/0342785 | A1 * | 11/2021 | Mann | G06F 3/0484 |
| 2022/0107802 | A1 * | 4/2022 | Rao | G06F 16/907 |
| 2024/0070210 | A1 * | 2/2024 | Balasubramanian | G06Q 30/0631 |

(Continued)

OTHER PUBLICATIONS

Learning to Suggest: A Machine Learning Framework for Ranking Query Suggestions (Year: 2012).*

*Primary Examiner* — Kim T Nguyen
(74) *Attorney, Agent, or Firm* — Fenwick & West LLP

(57) ABSTRACT

A trained machine-learning model is used to generate a user interface with filters personalized for a user of a computer system. Responsive to a search query, a computer system generates, based on user's features, a set of candidate filter combinations, each candidate filter combination having combined functionalities of a plurality of filters from a maintained collection of filters. The computer system applies the machine-learning model to generate a score for each candidate filter combination that is indicative of a likelihood of user's engagement with the plurality of filters or a likelihood of user's conversion on an item given a user's selection of the plurality of filters. The computer system selects, using the score for each candidate filter combination, a set of filter combinations. The computer system causes the user interface to display a set of user interface elements associated with the set of filter combinations along with search results.

20 Claims, 7 Drawing Sheets

(56)         References Cited

U.S. PATENT DOCUMENTS

| | | | |
|---|---|---|---|
| 2025/0156451 A1* | 5/2025 | Jensen | G06F 16/3322 |
| 2025/0165513 A1* | 5/2025 | Gudla | G06F 16/24522 |
| 2025/0209510 A1* | 6/2025 | Subramanya | G06F 40/284 |
| 2025/0211802 A1* | 6/2025 | Sloss | G06F 16/75 |
| 2025/0328594 A1* | 10/2025 | Gudla | G06F 16/9538 |

* cited by examiner

USING MACHINE-LEARNING MODEL TO GENERATE A USER INTERFACE WITH PERSONALIZED COMBINED FILTERS FOR SEARCH RESULTS

BACKGROUND

An online system can be used for placing online orders so that users of the online system can perform online purchases of various items (e.g., groceries) offered by sources (e.g., retailers). A search interface of the online system allows users to search for items where the users can enter search queries to get a set of results, and then the users can refine the search results using filters that are presented in a user interface. The filters that are presented are selected, from a maintained list of filters, based on the search query, where the maintained list of filters is based off of the item attributes and categories defined in an item catalog database to allow users to refine their search results. Although a set of filters presented in the user interface can be ranked based on their relevance relative to a user's search query and user preferences, the presented filters are selected from the static list of filters.

While the static list of filters that is currently maintained by the online system is useful, this static list of filters does not fully capture user preferences. For example, for a user who prefers gluten-free and dairy-free products, it would be desirable to present milk flavors filters combined with gluten-free and dairy-free filters as base filters, e.g., gluten-free chocolate, gluten-free vanilla, dairy-free chocolate, dairy-free vanilla, etc. In another example, for a price-sensitive user, it would be desirable to present the on-sale filter applied in conjunction with other filters. Currently, if a user wants to apply multiple filters, the user has to select each filter iteratively, which is inconvenient. Also, these filters are not personalized based on the user's preferences. Therefore, there is a technical problem of how to, automatically and at a large scale as required by the online system, combine multiple filters for presentation in a user interface, where each filter combination is based on preferences of a specific user of the online system.

SUMMARY

Embodiments of the present disclosure are directed to improving a user interface of a computer system (i.e., online system) that provides search results by using a trained machine-learning model to generate the user interface with combined filters that are personalized for a specific user of the computer system.

In accordance with one or more aspects of the disclosure, the computer system obtains a collection of filters, each filter from the collection of filters having a respective functionality for filtering search results. The computer system receives a query signal that is indicative of a search query entered via a user interface (UI) of a device associated with a user of the computer system. The computer system generates, using the received query signal, a set of search results. Responsive to the received query signal, the computer system obtains a set of features for the user. The computer system generates, based at least in part on the set of features for the user, a set of candidate filter combinations, each candidate filter combination from the set of candidate filter combinations having combined functionalities of a plurality of filters from the collection of filters. The computer system accesses a filter scoring machine-learning model that is trained to predict, for each candidate filter combination from the set of candidate filter combinations, an engagement likelihood or a conversion likelihood, wherein the engagement likelihood is a likelihood that, given selection by the user of a first UI element having a functionality of a first filter of the plurality of filters, the user will select a second UI element having a functionality of a second filter of the plurality of filters, and the conversion likelihood is a likelihood that, given selection by the user of the first UI element and the second UI element, the user will convert on an item from the set of search results. The computer system applies the filter scoring machine-learning model to the set of features for the user, a set of features of the search query, and a set of features for the plurality of filters associated with each candidate filter combination to generate a score for each candidate filter combination from the set of candidate filter combinations that is indicative of the engagement likelihood or the conversion likelihood. The computer system selects, using the score for each candidate filter combination from the set of candidate filter combinations, a set of filter combinations. The computer system generates, based at least in part on the selected set of filter combinations and the set of search results, a UI signal. The computer system sends, via a network, the UI signal to the device associated with the user, wherein the sending causes the device associated with the user to display the UI with a set of UI elements along with the set of search results, each UI element from the set of UI elements having a functionality of a respective filter combination from the selected set of filter combinations for filtering the set of search results when each UI element is selected by the user.

DETAILED DESCRIPTION

Figure 1A:
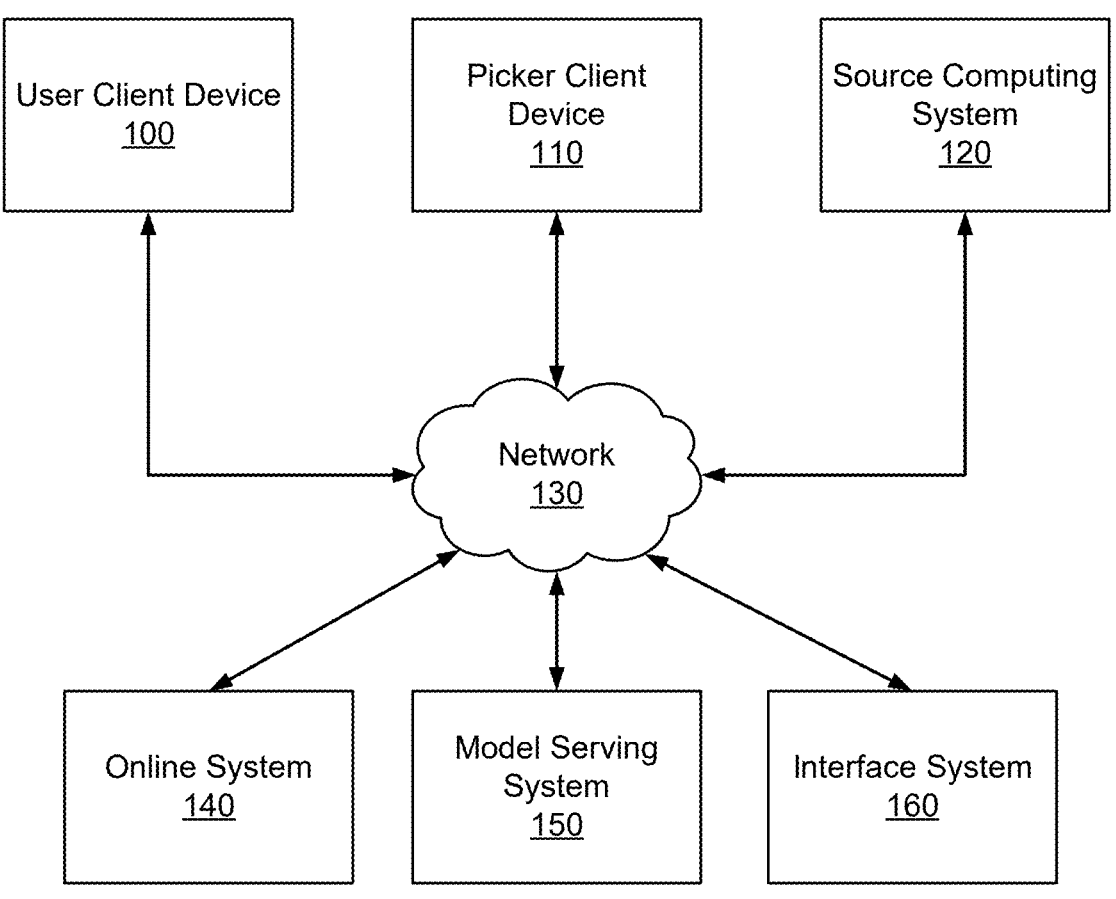
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a user client device 100, a picker client device 110, a source computing system 120, a network 130, an online system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1A, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system 140 and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140.

The online system 140 provides a search interface for users to search for items in an online catalog maintained by the online system 140. When presenting the search results to a user, the online system 140 also provides a set of filters, which the user can select to refine the search results, where the filters relate to attributes of the items in the search results. Since the user may wish to select multiple filters, the online system 140 determines whether and how to combine groupings of filters so that the user can select multiple filters more easily. To select and combine groupings of filters based on user's preferences, the online system 140 deploys a machine-learning model that is trained to score a combination of filters, e.g., based on a likelihood of conversion or a likelihood of the user selecting the multiple filters. Based on the scores output by the trained machine-learning model, the online system 140 ranks, selects, and presents to the user combined filters (and possibly some individual filters as well) on a search interface along with the search results.

Hence, the online system 140 applies the trained machine-learning model to make the filters more dynamic and user-friendly by generating personalized combinations of commonly used filters that improve user efficiency. For example, for a user of the online system 140 who usually purchases gluten-free items and enters a search query "snacks", the search user interface may present personalized combined filters, such as gluten-free crackers, gluten-free chips, gluten-free popcorn, etc. In another example, for a user of the online system 140 who always selects the on-sale filter along with other filters for the search query "milk", the online system 140 generates new filter combinations such as "on-sale+organic", "on-sale+organic+chocolate", "on-Sale+2% fat", etc. that are then displayed on the search interface along with search results.

To generate the personalized combined filters, the online system 140 uses the existing user engagement data that can be retrieved from the search, browse logs, etc. Specifically, the online system 140 determines the attribute combinations at runtime to account for user preferences and also surface more personalized content. The process of obtaining personalized combined filters for presentation in a user interface performed by the online system 140 may be divided into two stages-generation of filter combinations and ranking of the previously generated filter combinations. An input to the generation stage may be data from the search/browse engagement logs, whereas an output from the generation stage may be a list of candidate filter combinations (e.g., candidate filter pairs). Some of the candidate filter combinations may be also generated organically and/or by prompting a Large Language Model (LLM). An input to the ranking stage may be the candidate filter combinations, and an output from the ranking stage may a likelihood of user's conversion or a likelihood of user's engagement for the given candidate filter combination, which is then used to rank the candidate filter combinations and obtain a final list of filter combinations (e.g., filter pairs) for presentation to the user.

The model serving system 150 receives requests from the online system 140 to perform tasks using machine-learning models. The tasks include, but are not limited to, natural language processing (NLP) tasks, audio processing tasks, image processing tasks, video processing tasks, and the like. In one or more embodiments, the machine-learning models deployed by the model serving system 150 are language models configured to perform one or more NLP tasks. The NLP tasks include, but are not limited to, text generation, query processing, machine translation, chatbots, and the like. In one or more embodiments, a language model of the model serving system 150 is configured as a transformer neural network architecture (i.e., a transformer model). Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learning model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learning model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLM, the LLM is able to perform various tasks and synthesize and formulate output responses based on information extracted from the training data.

In one or more embodiments, when the machine-learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described in one or more embodiments, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

The online system 140 may employ an LLM of the model serving system 150 to generate a list of item attributes and/or item categories personalized for a given user of the online system 140. The online system 140 may prepare (e.g., via a prompt generation module 260 in FIG. 2) a prompt for input to the LLM. The prompt may include a list of items (e.g., generated from a user's search query), information about the user and/or information about the user's persona. The prompt may further include a request for the LLM to generate a personalized list of item attributes and/or item categories.

The LLM may generate a response to the prompt based on execution of the machine-learning model using the prompt. The response may include the personalized list of item attributes and/or item categories. The online system 140 may import the response from the model serving system 150 and use the response to generate a list of candidate filter combinations (e.g., candidate filter pairs) personalized for the given user.

In one or more embodiments, the task for the model serving system 150 is based on knowledge of the online system 140 that is fed to the machine-learning model of the model serving system 150, rather than relying on general knowledge encoded in the model weights of the model. Thus, one objective may be to perform various types of queries on the external data in order to perform any task that the machine-learning model of the model serving system 150 could perform. For example, the task may be to perform question-answering, text summarization, text generation, and the like based on information contained in an external dataset.

Thus, in one or more embodiments, the online system 140 is connected to an interface system 160. The interface system 160 receives external data from the online system 140 and builds a structured index over the external data using, for example, another machine-learned language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online system 140 can generate a prompt using the external data as context, often times, the amount of information in the external data exceeds prompt size limitations configured by the machine-learning language model. The interface system 160 can resolve prompt size limitations by generating a structured index of the data and offers data connectors to external data sources.

Figure 1B:
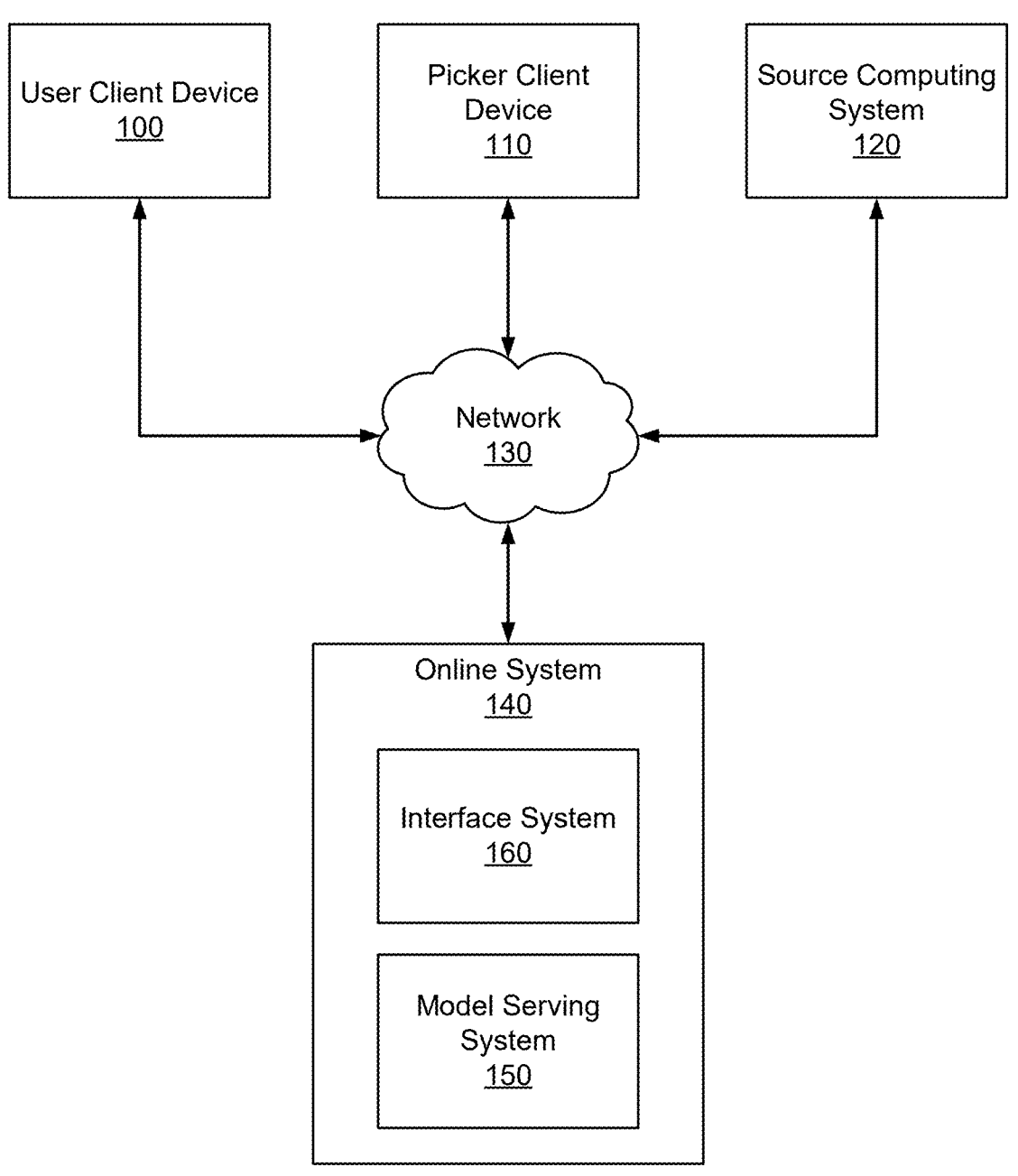
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a user client device 100, a picker client device 110, a source computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online system 140. In one or more embodiments, as illustrated in the example system environment in FIG. 1B, the model serving system 150 and/or the interface system 160 is managed and deployed by the entity managing the online system 140. The online system 140 is described in further detail below with regards to FIG. 2.

Figure 2:
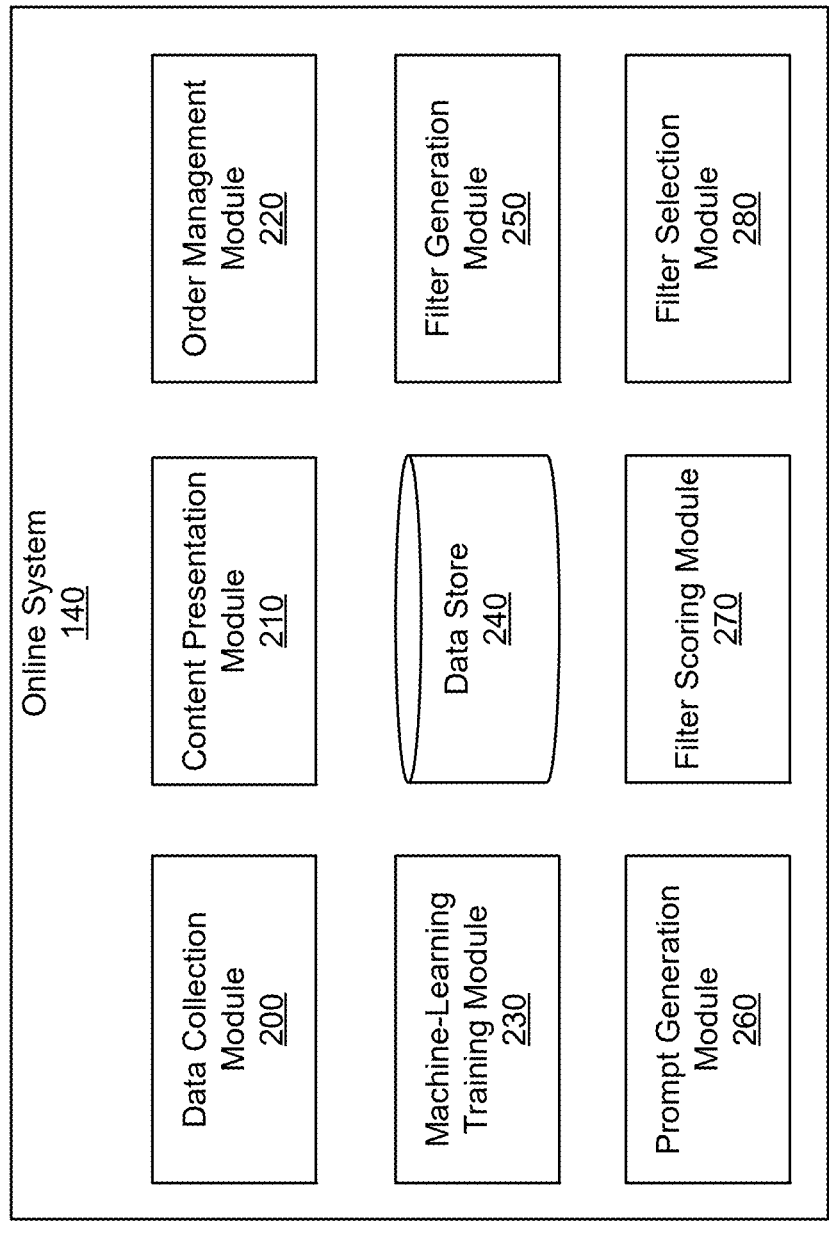
FIG. 2 illustrates an example system architecture for an online system, in accordance with one or more embodiments.

FIG. 2 illustrates an example system architecture for the online system 140, in accordance with some embodiments. The system architecture illustrated in FIG. 2 includes a data collection module 200, a content presentation module 210, an order management module 220, a machine-learning training module 230, a data store 240, a filter generation module 250, a prompt generation module 260, a filter scoring module 270, and a filter selection module 280. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from the source computing system 120, the picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In one or more embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In one or more embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In one or more embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learning models hosted by the model serving system 150, the machine-learning models may already be trained by a separate entity from the entity responsible for the online system 140. In one or more other embodiments, when the model serving system 150 is included in the online system 140, the machine-learning training module 230 may further train parameters of the machine-learning model based on data specific to the online system 140 stored in the data store 240. As an example, the machine-learning training module 230 may obtain a pre-trained transformer language model and further fine tune the parameters of the transformer language model using training data stored in the data store 240. The machine-learning training module 230 may provide the transformer language model to the model serving system 150 for deployment.

The online system 140 maintains a catalog of filters in the data store 240 that can be applied to search results generated in response to a search query entered by a user of the online system 140 via a user interface of the user client device 100. The catalog of filters may be related to attributes of items stored in an item catalog database (e.g., at the data store 240). When the user enters the search query and queries a search engine of the online system 140, the online system 140 acquires search results from the item catalog database and presents the search results in the user interface. Along with the search results, the online system 140 also presents filters for refining the search results retrieved from the catalog of filters using the search results.

In one or more embodiments, instead of maintaining the catalog of filters in the data store 240, the online system 140 generates (e.g., via the filter generation module 250) filters given the generated search results. Specifically, the filter generation module 250 may obtain attributes of items in the search results and then use the obtained attributes as filters for displaying at the user interface, e.g., by selecting the most commonly repeated attributes from the search results. Hence, the filters displayed at the user interface may directly depend on the attributes of the items in the search results. The filters generated in this manner may be stored in the data store 240 as a collection of attributes for later use.

The filter generation module 250 may generate personalized candidate filter combinations (e.g., personalized candidate filter pairs) based on user's input features. The user's input features may include information that can be obtained from user's historic engagement logs, such as information about user's previous engagement with filters, attributes of items the user converted in the past, attributes from user's past search queries, information about instances of filter co-occurrences (i.e., co-selections of filters), some other user related data, or some combination thereof. For example, the filter generation module 250 can use attributes from the user's past search query (e.g., 2% organic milk) to generate a personalized candidate filter combination, e.g., "2%+ organic". To generate the personalized candidate filter combinations, the filter generation module 250 may extract a set of user preferences from the user's engagement logs, in particular focusing on the filters selected by the user and attributes of items the user searched, browsed, clicked, and/or converted. The filter generation module 250 may retrieve the user's historic engagement logs from a user catalog database (e.g., at the data store 240).

The filter generation module 250 may augment the user's input features generated using the user's historic engagement logs with an output from an LLM (e.g., LLM of the model serving system 150). The prompt generation module 260 may generate a prompt for input to the LLM. The prompt may include a list of items that a search engine of the online system 140 returned in response to the user's search query, as well as certain characteristics of the user, such as an identification of user's persona. The prompt may further include a request for the LLM to generate a response with types of attributes that the user prefers or may be interested in. The response provided by the LLM may be imported to the online system 140, e.g., via the filter generation module 250, and utilized to augment the user input features. It should be noted that the usage of LLM for generating a list of attributes for which a given user of the online system 140 may be interested in may be suitable for solving the cold start problem when this is a new user for whom there is not enough data in the item catalog database.

The filter generation module 250 may generate personalized candidate filter combinations (e.g., personalized candidate filter pairs) using the user input features augmented by the list of attributes output by the LLM. Hence, LLM generated filter combinations can also be used to further augment the set of candidate filter combinations. In other words, the filter generation module 250 may generate candidate filter combinations that account for filters having their functionalities combined based on the user's personal preferences and the LLM's knowledge.

Alternatively or additionally, the filter generation module 250 may generate candidate filter combinations organically based on a likelihood of engagement by the user. For example, when the user is price sensitive and will likely select the individual filter "on sale," the filter "on sale" may be combined with one or more remaining individual filters. In another example, for a user of the online system 140 who prefers gluten-free items, the filter generation module 250 may generate filter combinations of the "gluten-free" individual filter and other individual filters to generate the list of personalized candidate filter combinations.

From the initial list of personalized candidate filter combinations, the filter generation module 250 may select the top k candidate filter combinations (e.g., filter pairs) chosen across a set of users that are ranked by popularity (e.g., a likelihood of conversion or likelihood of engagement). In an example of generating candidate filter pairs, the filter generation module 250 may select a set of candidate filter pairs as:

$$\text{set of filter-pairs}=top\ k\{\{p \\ (\text{filter2 engaged}|\text{filter1 engaged})\}\text{union}\{p \\ (\text{filter1 engaged}|\text{filter2 engaged})\}\}, \qquad (1)$$

where k is a hyperparameter which can be set to ensure that a minimal level of engagement is observed for the selected filters, p(filter2 engaged|filter1 engaged) is a likelihood of a second filter in a pair being engaged with when a first filter in the pair is engaged with, and p(filter1 engaged|filter2 engaged) is a likelihood of the first filter being engaged with when the second filter is engaged with.

Hence, in addition to the set of candidate filter combinations, the filter generation module 250 may output the likelihood of conversion or the likelihood of engagement for each candidate filter combination estimated based on likelihoods of conversion or likelihoods of engagement for individual filters. For example, inputs to the filter generation module 250 can be the search query "milk", attributes extracted from the search query, such as "food", "dairy", etc., and user's persona, such as "health-conscious". Outputs generated by the filter generation module 250 may be the set of candidate filter combinations, and optionally the likelihood of conversion or the likelihood of engagement for each candidate filter combination, such as: {on-sale, 2%}→p (conversion) or p(engagement), {whole, 2%}→p(conversion) or p(engagement), {chocolate, 2%}→p(conversion) or p(engagement), etc. In one or more embodiments, the filter generation module 250 filters out one or more candidate filter combinations based on the number of eligible items that would be recalled for those candidate filter combinations.

Once the set of candidate filter combinations are generated, the next stage is to rank these candidate filter combinations. The filter scoring module 270 may output a score for each candidate filter combination from the set of candidate filter combinations provided by the filter generation module 250, and the score for each candidate filter combination will be later used to rank the set of candidate filter combinations. The filter scoring module 270 may access a filter scoring model (e.g., machine-learning model) that is trained to generate the score for each candidate filter combination. The filter scoring module 270 may deploy the filter scoring model to run a machine-learning algorithm to output, based on input signals, the score for each candidate filter pair that is indicative of a likelihood of conversion (or likelihood of engagement) when each candidate filter combination is presented to the user. The score may be a value between 0 and 1, where a higher value of the score may indicate a higher level of likelihood of conversion (or higher level of likelihood of engagement) when a candidate filter combination is presented to the user, and a lower value of the score may indicate a lower level of likelihood of conversion (or lower level of likelihood of engagement) when the candidate filter combination is presented to the user. A set of parameters for the filter scoring model may be stored at one or more non-transitory computer-readable media of the filter scoring module 270. Alternatively, the set of parameters for the filter scoring model may be stored at one or more non-transitory computer-readable media of the data store 240.

In one or more embodiments, the filter scoring model generates a score for a particular candidate filter combination (e.g., candidate filter pair) that is indicative of a likelihood, given the user's selection of a first filter of the candidate filter combination, that the user would also select a second filter of the candidate filter combination. Alternatively, the filter scoring model may generate a score for a particular candidate filter combination (e.g., candidate filter pair) that is indicative of a likelihood of selecting all filters (e.g., both filters) of the candidate filter combination (i.e., "p(engagement|filter)"). In such cases, the online system 140 deploys the filter scoring model to optimize a user interface for user's convenience.

In one or more other embodiments, the filter scoring model generates a score for a particular candidate filter combination (e.g., candidate filter pair) that is indicative of a likelihood, given the user's selection of all filters together (e.g., first and second filters for the candidate filter pair) that the user will convert on an item. Alternatively, the filter scoring model may generate a score for a particular candidate filter combination (e.g., candidate filter pair) that is indicative of an increase of a likelihood that the user will convert on an item due to the selection of all filters of the candidate filter combination in comparison to when no filters are presented to the user. In such cases, the filter scoring model may be trained to operate as a conversion machine-learning model that computes p(conversion|filter) (i.e., likelihood that the user will convert on an item given the user's selection of filter combination), which can be implemented as a classification machine-learning model, a logistic regression machine-learning model, or some other type of machine-learning model.

For a given candidate filter pair {filter1, filter2}, the filter scoring model may compute the combined filters' likelihood of conversion as p(conversion|filter1)*p(conversion|filter2), where p(conversion|filter1) is a likelihood that the user will convert on an item given the user's selection of filter1, and p(conversion|filter2) is a likelihood that the user will convert on the item given the user's selection of filter2. Note that this approach assumes independence of the two filters of the candidate filter pair. Alternatively, the filter scoring model may be trained to compute p(conversion|filter1, filter2), i.e., a likelihood that the user will convert on an item given the user's selection of filter1 and the user's selection of filter 2.

In providing the input signals to the filter scoring model, the filter scoring module 270 may provide user features, query features (e.g., item category, intent, attributes of the items that convert on the query, etc.), filter features (e.g., past engagement, query relevance, etc.), contextual data (e.g., regional filters), features of a source associated with the online system 140, some other relevant feature, or some combination thereof. The filter scoring module 270 may retrieve the user features from a user database (e.g., stored at the data store 240) and the features of the source from a source database (e.g., stored at the data store 240).

In providing the filter features to the filter scoring model, the filter scoring module 270 may provide user level engagement data, overall engagement data, relevance to a query, a number of results when the filter is applied, a distribution of item features when the filter applied, some other filter related data, or some combination thereof. The filter scoring module 270 may extract the filter features from user's engagement data retrieved from a user catalog database (e.g., at the data store 240) and/or from the user's query.

In providing the query features to the filter scoring model, the filter scoring module 270 may provide a query category, a query length, a query specificity, query attributes (e.g., brand, dietary etc.), an indication of an intent of the query, some other query related data, or some combination thereof. The filter scoring module 270 may receive the query features from the user client device 100 via the network 130 or may extract the query features from the query.

The machine-learning training module 230 may perform initial training of the filter scoring model using training data obtained from users' interactions with filters following search queries. The machine-learning training module 230 may generate the training data by labeling past users' interactions (i.e., selections) of filter combinations (e.g., filter pairs) where each filter is individually presented. In one or more embodiments, a label is set to 1 when both filters of a filter pair are selected, otherwise the label is set to 0. Alternatively, the label is set to 1 when both filters of a filter pair are selected, and the label is set to 0 if a first filter of the filter pair is selected and a second filter of the filter pair is not selected; otherwise, this filter pair is not a training example. In one or more other embodiments, a label is set to be equal p(conversion|filter1)*p(conversion|filter2). Although this approach does not take into account the synergy of using both filters at the same time, it is less sparse (e.g., a smaller number of 0 labels are generated) and allows for extension to more than two filters. Alternatively, the label may be set to be equal to a likelihood of conversion when both filters in the filter pair are selected. The machine-learning training module 230 may train the filter scoring model using the training data to generate initial values for the set of parameters of the filter scoring model.

The filter selection module 280 may select one or more candidate filter combinations from the generated set of candidate filter combinations based on their scores generated by the filter scoring model. Prior to the selection, the filter selection module 280 may rank the set of candidate filter combinations based on the scores to form a final ranked list of filters. The filter selection module 280 may then select and order the filter combinations according to their scores. The content presentation module 210 may then generate a user interface signal based on the selected filter combinations and send the user interface signal to the user client device 100 via the network 130. The user interface signal may cause the user client device 100 to display a user interface with the filter combinations output by the filter selection module 280 in connection with the search results. When a user selects a filter combination, then the user interface of the user client device 100 presents the search results filtered according to the selected filter combination.

In one or more embodiments, in addition to the ranking of candidate filter combinations based on their scores generated by the filter scoring model, the filter selection module 280 also ranks individual filters. In such cases, the filter selection module 280 may need to determine when an individual filter is ranked behind or in from a filter combination (e.g., filter pair) that includes the individual filter. Note that, when optimizing for conversion, a score (i.e., likelihood of conversion) generated by the filter ranking model for an individual filter could be lower than a score for a filter combination that includes the single filter. However, when optimizing for user interface selection of filters (i.e., user engagement), a likelihood of the engagement with filter 1 and filter 2 is never larger than a likelihood of the engagement with filter 1. In such a case, the filter scoring model may generate a score that is indicative of a likelihood of the engagement with filter 1 alone as being a likelihood of the engagement with filter 1 and not filter 2. Note that this may provide a relative rank between filter 1 and the combination of filters 1 and 2.

When ranking the candidate filter combinations together with single filters, one of the challenges is to determine when a candidate filter combination (e.g., filter pair composes of filter1 and filter2) has a higher score (i.e., higher likelihood of conversion on an item) than the individual filters in the candidate filter combination (e.g., filter1 or filter2). In one or more embodiments, the "naive formulation" for combined filters' likelihood of conversion computed as p(conversion|filter1)*p(conversion|filter2) can be used as a prior likelihood of conversion for the candidate filter combination, and a posterior likelihood of conversion for the candidate filter combination can be updated based on the likelihood of user's engagement, as given by:

$$p(\text{conversion}|\text{filter1},\text{filter2})==p(\text{filter1}, \\ \text{filter2}|\text{conversion})*p(\text{conversion})/(p(\text{filter1})*p \\ (\text{filter2})),  \quad (2)$$

where p(filter1, filter2|conversion) is a likelihood of the user's engagement with both filter1 and filter2 given the conversion on the item, p(conversion) is a likelihood of the conversion on the item, p(filter1) is a likelihood of the user's engagement with filter1, and p(filter2) is a likelihood of the user's engagement with filter2.

When scoring of the candidate filter combinations by the filter scoring model is based on p(conversion|filter1, filter2) given by equation (2), scoring the individual filters by the filter scoring model may be given by:

$$p(\text{conversion}|\text{filter1})==\Sigma_x p(\text{conversion}|\text{filter1},\text{filterX}) \\ *p(\text{conversion}|\text{filterX})/\Sigma_x p(\text{filterX}), \quad (3)$$

where p(conversion|filter1) is a likelihood of the conversion on the item given the user's selection of filter1, p(conversion|filter1, filterX) is a likelihood of the user's engagement with both filter1 and filterX given the conversion on the item, p(conversion|filterX) is a likelihood of the conversion on the item given the user's selection of filterX, and p(filterX) is a likelihood of the user's engagement with filterX.

In one or more other embodiments, instead of ranking together candidate filter combinations and individual filters, the filter selection module 280 ranks the candidate filter combinations and individual filters separately. In such cases, the content presentation module 210 may generate a first interface signal for presenting selected filter combinations and a second interface signal for presenting selected individual filters. Then, the first interface signal may cause the user client device 100 to display a user interface with allocated slots (i.e., space) for the filter combinations, and the second interface signal may cause the user client device 100 to display the user interface with separate allocated slots (i.e., separate space) for the single filters.

The machine-learning training module 230 may collect feedback data with information about an interaction by the user with one or more filter combinations presented at a user interface of the user client device 100 following a search query entered by the user via the user interface. The machine-learning training module 230 may then re-train the filter scoring model by updating the set of parameters of the filter scoring model using the feedback data.

It should be noted that, while the approach presented herein is applied for filters, this approach can also be extended to update other parts of the stack, such as the product taxonomy tree. Currently, the product taxonomy tree stored in the data store 240 is static, but depending on the product distribution and user's interests, taxonomy nodes may be combined or split for better representation of the product groups.

Figure 3:
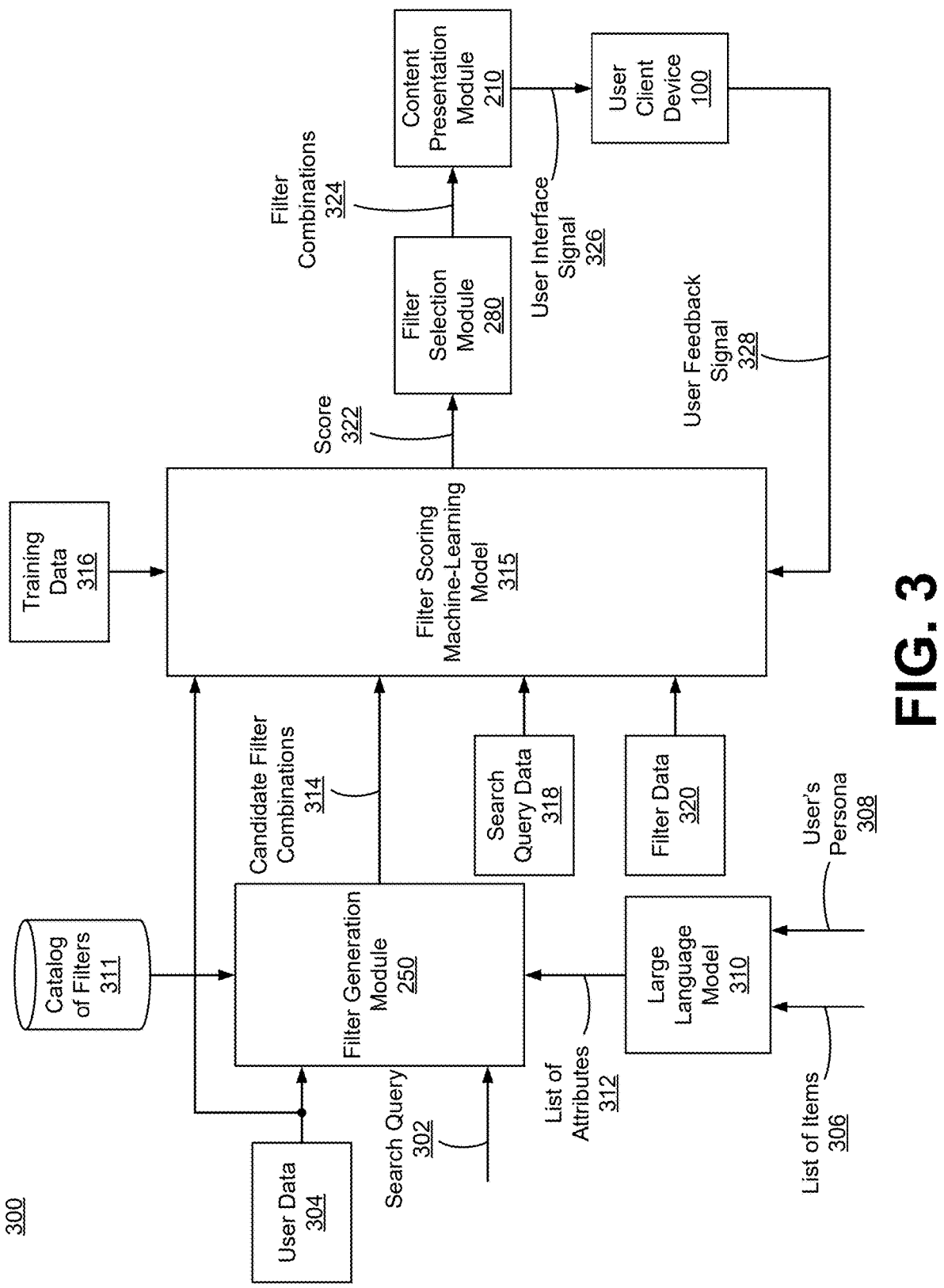
FIG. 3 illustrates an example architectural flow diagram of using a trained machine-learning model of an online system to generate a user interface of the online system with personalized combined filters, in accordance with one or more embodiments.

FIG. 3 illustrates an example architectural flow diagram 300 of using a trained filter scoring machine-learning model 315 of the online system 140 to generate a user interface of the online system 140 with personalized combined filters, in accordance with one or more embodiments. The process flow may be initiated once the online system 140 receives a search query 302 entered by a user of the online system 140 via a user interface of the user client device 100. Upon receiving the search query 302, the filter generation model 250 may obtain user data 304 extracted from user's historic engagement logs, such as information about user's previous engagement with filters, attributes of items the user converted in the past, attributes from user's past search queries, information about instances of filter co-occurrences (co-selections), some other user related data, or some combination thereof. The filter generation module 250 may retrieve the user's historic engagement logs from the data store 240.

The user data 304 input into the filter generation module 250 may be augmented with an output from an LLM 310 (e.g., LLM of the model serving system 150). A prompt input into the LLM may include a list of items 306 generated based on the search query 302 and an identification of a user's persona 308. The LLM 310 may generate, using the list of items 306 and the identification of the user's persona 308 to generate a response that includes a list of attributes personalized for the user. The filter generation module 250 may generate, based on the user data 304, the list of attributes 312 and a catalog of filters 311 (e.g., maintained at the data store 240), a set of candidate filter combinations 314. Each candidate filter combination 314 may have combined functionalities of two or more filters (e.g., pair of filters) from the catalog of filters 311. The filter generation module 250 may pass an identification of each candidate filter combination 314 to the filter scoring machine-learning model 315.

Prior to running a machine-learning algorithm of the filter scoring machine-learning model 315, the online system 140 may perform (e.g., via the machine-learning training module 230) initial training of the filter scoring machine-learning model 315 using training data 316 to generate initial values for a set of parameters of the filter scoring machine-learning model 315. The training data 316 may be generated (e.g., via the machine-learning training module 230) by generating labels using information about past users' interactions (i.e., selections) of filter combinations (e.g., filter pairs) where each filter is individually presented to users of the online system 140. For example, a label may be set to 1 when both filters of a filter pair are selected, otherwise the label may be set to 0. Alternatively, the label may be set to 1 when both filters of a filter pair are selected, and the label may be set to 0 if a first filter of the filter pair is selected and a second filter of the filter pair is not selected. Alternatively, the label may be set to be equal to a likelihood of conversion (e.g., estimated using users' engagement data from the data store 240) when both filters in the filter pair are selected. After the training process is completed, the online system 140 may provide a set of inputs to the filter scoring machine-learning model 315 (e.g., via the filter scoring module 270), such as the user data 304, search query data 318, and filter data 320. Some additional inputs not shown in FIG. 3 suitable for identifying a likelihood of a user's engagement with each candidate filter combination 314, or a likelihood of a user's engagement given the selection of each candidate filter combination 314, may be further provided to the filter scoring machine-learning model 315.

In providing the search query data 318 to the filter scoring machine-learning model 315, the filter scoring module 270 may provide information about a product category specified in the search query 302, a length of the search query 302, a specificity of the search query 302, attributes (e.g., brand, dietary etc.) specified in the search query 302, a user's intent in relation to the search query 302, some other query related data, or some combination thereof. The filter scoring module 270 may receive the search query data 318 from the user client device 100 via the network 130.

In providing the filter data 320 to the filter scoring machine-learning model 315, the filter scoring module 270 may provide information about user's historical engagement with each candidate filter combination 314, relevance of each candidate filter combination 314 to the search query 302, a number of results to the search query 302 when each candidate filter combination 314, a distribution of item features when each candidate filter combination 314 is applied, some other filter related data, or some combination thereof. The filter scoring module 270 may extract the filter data 320 from user's engagement data retrieved (e.g., via the filter scoring module 270) from a user catalog database (e.g., stored at the data store 240) and/or from search results generated responsive to the search query 302 when each candidate filter combination 314 is selected by the user.

The filter scoring machine-learning model 315 may apply the machine-learning algorithm to the user data 304, the search query data 318 and/or the filter data 320 to generate a score 322 (e.g., value between 0 and 1) for each candidate filter combination 314 that indicates a likelihood that, given selection by the user of a first filter of each candidate filter combination 314, the user will select a second filter of each candidate filter combination 314. Alternatively, the score 322 may be indicative of a likelihood that, given selection by the user of the first filter and the second filter of each candidate filter combination 314, the user will convert on an item from the search results generated in response to the search query 302. The filter scoring machine-learning model 315 may pass the score 322 for each candidate filter combination 314 to the filter selection module 280.

The filter selection module 280 may first rank all candidate filter combinations 314 based on their scores 322, and then select a set of filter combinations 324 for presentation to the user as a predetermined number of candidate filter combinations 314 with the highest scores. Note that, in one or more embodiments, the set of filter combinations 324 is augmented with individual filters (e.g., from the catalog of filters) having predicted likelihoods of user's engagement or user's conversion that are sufficiently high. The filter selection module 280 may pass identifications of the selected filter combinations 324 (and, optionally, individual filters) to the content presentation module 210.

Based on the identifications of the selected filter combinations 324, the content presentation module 210 may generate a user interface signal 326 that is passed, via the network 130, to the user client device 100. The user interface signal 326 may cause the user client device 100 to display a user interface with a set of user interface elements along with the search results generated in response to the search query, where each user interface element from the set of user interface elements has a functionality of a respective filter combination from the selected set of filter combinations 324 (or a functionality of a corresponding individual filter from the catalog of filters 311) for filtering the search results when each user interface element is selected by the user.

The user client device 100 may generate and record a user feedback signal 328 with information about an interaction by the user with the set of user interface elements and an engagement by the user with one or more items (e.g., conversion of the one or more items, only viewing product details of the one or more items without conversion, etc.). The online system 140 may receive (e.g., via the machine-learning training module 230) the user feedback signal 328 from the user client device 100 via the network 130. The machine-learning training module 230 may utilize the user feedback signal 328 to re-train the filter scoring machine-learning model 315. By utilizing user feedback signals 328 from various users of the online system 140 over time, the machine-learning training module 230 may continuously update the set of parameters of the filter scoring machine-learning model 315 and improve over time the machine-learning algorithm of the filter scoring machine-learning model 315.

Figure 4A:
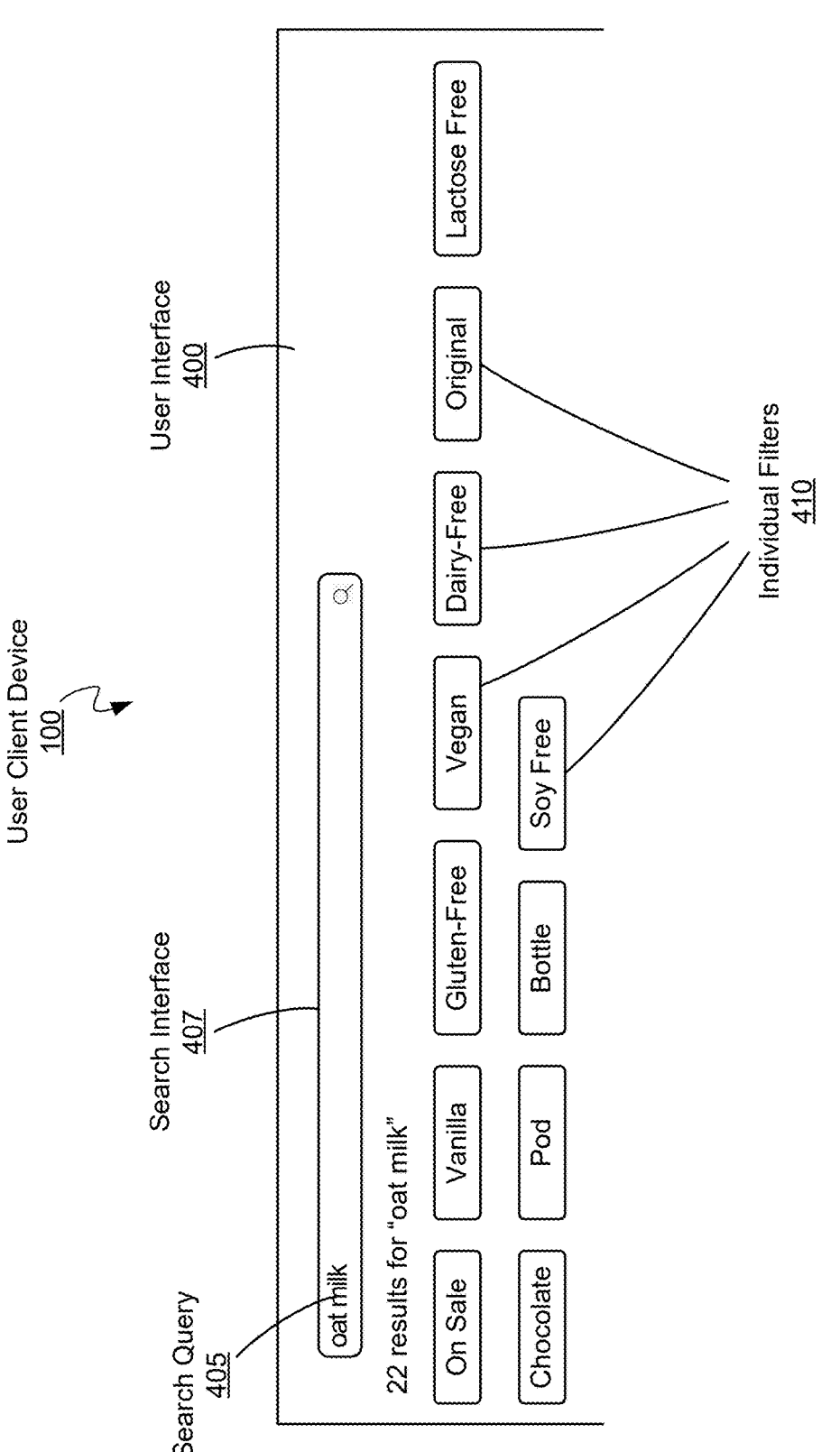
FIG. 4A illustrates an example user interface of an online system with individual non-personalized filters, in accordance with one or more embodiments.

FIG. 4A illustrates an example user interface 400 of the user client device 100 that displays individual non-personalized filters 410, in accordance with one or more embodiments. The individual non-personalized filters 410 are retrieved from a filter catalog database (e.g., at the data store 240) based on attributes and product categories in a search query 405 (e.g., "oat milk") entered by a user of the online system 140 via a search interface 407. Example individual non-personalized filters 410 displayed at the user interface 400 in response to the search query 405 are: "on sale", "vanilla", "gluten-free", "vegan", "dairy-free", "original", "lactose free", "chocolate", "pod", "bottle", "soy free", etc. The user may select one or more of the individual filters 410 to filter results of the search query 405 (e.g., 22 results for "oat milk").

Figure 4B:
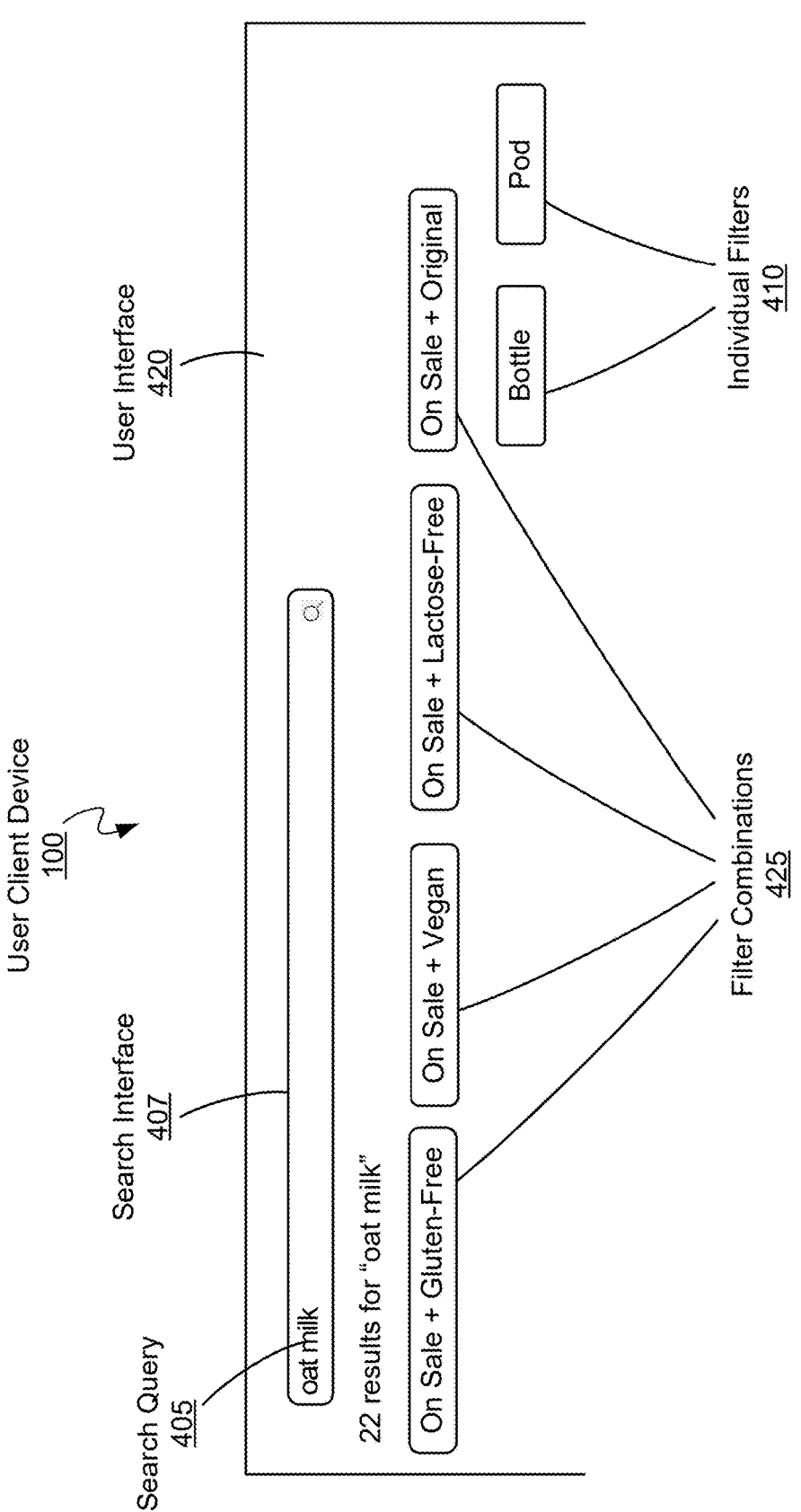
FIG. 4B illustrates an example user interface of an online system with personalized filter combinations, in accordance with one or more embodiments.

FIG. 4B illustrates an example user interface 420 of the user client device 100 that displays personalized filter combinations 425, in accordance with one or more embodiments. Responsive to the search query 405 (e.g., "oat milk"), the online system 140 may run the process flow as described in relation to FIG. 2 and FIG. 3 to generate the personalized filter combinations 425. In the example of FIG. 4B, a user of the online system 140 is price sensitive and health-conscious (or dietary conscious). Hence, examples of the personalized filter combinations 425 generated for this particular user are: "on sale+gluten-free" (combines functionalities of the individual filters 410 "on sale" and "gluten-free"), "on sale+vegan" (combines functionalities of the individual filters 410 "on sale" and "vegan"), "on sale+lactose-free" (combines functionalities of the individual filters 410 "on sale" and "lactose-free"), and "on sale+original" (combines functionalities of the individual filters 410 "on sale" and "original"). In addition to the personalized filter combinations 425, the user interface 420 may also display some of the individual filters 410 (e.g., "bottle" and "pod") for which the online system 140 has estimated sufficiently high likelihoods of user's engagement and/or user's conversion. The user may select one or more of the personalized filter combinations 425 and/or one or more of the individual filters 410 to filter results of the search query 405 (e.g., 22 results for "oat milk").

Figure 5:
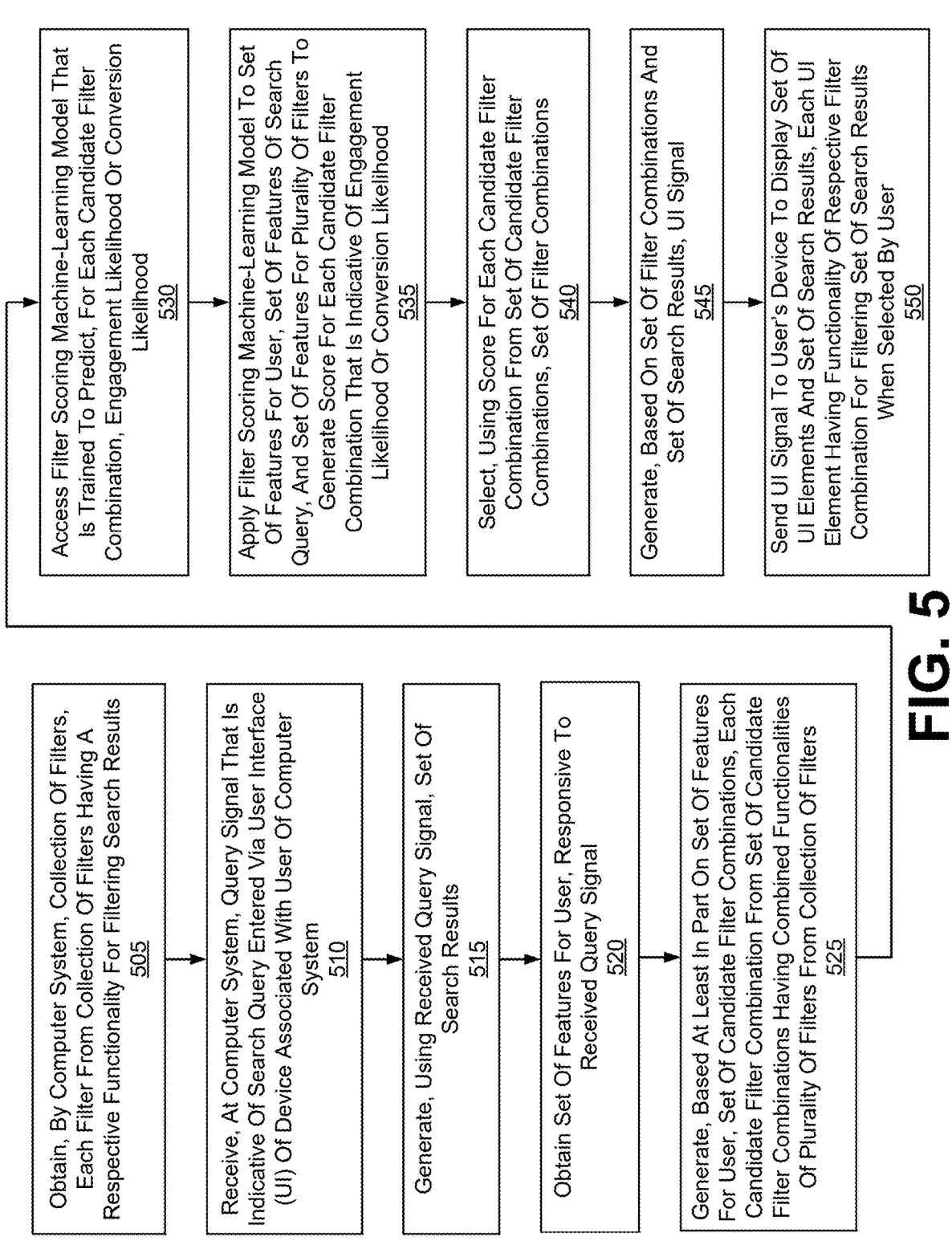
FIG. 5 is a flowchart for a method of using a trained machine-learning model to generate a user interface with combined personalized filters, in accordance with one or more embodiments.

FIG. 5 is a flowchart for a method of using a trained machine-learning model to generate a user interface with combined personalized filters, in accordance with one or more embodiments. Alternative embodiments may include more, fewer, or different steps from those illustrated in FIG. 5, and the steps may be performed in a different order from that illustrated in FIG. 5. These steps may be performed by a computer system, such as an online system (e.g., the online system 140). In one or more embodiments, the computer system is a computing terminal separate from the online system and is connected to the online system via a network (e.g., the network 130). Additionally, each of these steps may be performed automatically by the computer system without human intervention.

The computer system obtains 505 (e.g., via the filter generation module 250) a collection of filters, each filter from the collection of filters having a respective functionality for filtering search results. The computer system receives 510 (e.g., at the order management module 220) a query signal that is indicative of a search query entered via a user interface (UI) of a device associated with a user of the computer system (e.g., the user client device 100). The computer system generates 515 (e.g., via the order management module 220), using the received query signal, a set of search results.

Responsive to the received query signal, the computer system obtains 520 (e.g., via the filter generation module 250) a set of features for the user. The computer system generates 525 (e.g., via the filter generation module 250), based at least in part on the set of features for the user, a set of candidate filter combinations, each candidate filter combination from the set of candidate filter combinations having combined functionalities of a plurality of filters (e.g., pair of filters) from the collection of filters.

The computer system may retrieve (e.g., via the filter generation module 250), from a database (e.g., the data store 240), engagement data for the user. The computer system may obtain the set of features for the user by extracting (e.g., via the filter generation module 250), from the engagement data, at least one of information about a previous engagement by the user with the collection of filters, information about attributes of a collection of items converted by the user, or information about attributes related to a collection of search queries entered by the user.

The computer system may generate (e.g., via the prompt generation module 260) a prompt for input into a LLM (e.g., LLM of the model serving system 150), the prompt including a list of items from the set of search results, information about a persona of the user, and a request for generating a response that includes a list of item attributes personalized for the user. The computer system may request (e.g., via the prompt generation module 260) the LLM to generate, based on the prompt input into the LLM, the response that includes the list of item attributes. The computer system may generate (e.g., via the filter generation module 250) the set of candidate filter combinations further based on the list of attributes.

The computer system may further extract (e.g., via the filter generation module 250), from the engagement data, instances of a set of pluralities of filters from the collection of filters such that UI elements associated with each plurality of filters from the set of pluralities of filters were co-selected by the user. The computer system may generate (e.g., via the filter generation module 250), further using the instances of the set of pluralities of filters, the set of candidate filter combinations.

The computer system accesses 530 a filter scoring machine-learning model (e.g., via the filter scoring module 270), wherein the filter scoring machine-learning model is trained to predict, for each candidate filter combination from the set of candidate filter combinations, an engagement likelihood or a conversion likelihood. The engagement likelihood is a likelihood that, given selection by the user of a first UI element having a functionality of a first filter of the plurality of filters, the user will select a second UI element having a functionality of a second filter of the plurality of filters. The conversion likelihood is a likelihood that, given selection by the user of the first UI element and the second UI element, the user will convert on an item from the set of search results. The computer system applies 535 the filter scoring machine-learning model (e.g., via the filter scoring module 270) to the set of features for the user, a set of features of the search query, and a set of features for the plurality of filters associated with each candidate filter combination to generate a score for each candidate filter combination from the set of candidate filter combinations that is indicative of the engagement likelihood or the conversion likelihood.

The computer system may receive (e.g., at the filter scoring module 270), from the device associated with the user and via the network, query data with information about the set of features of the search query including at least one of one or more categories of one or more items from the set of search results, an indication about an intent of the user in relation to the search query, or one or more attributes of the one or more items. The computer system may further extract (e.g., via the filter scoring module 270), from the engagement data, information about an engagement by the user with the plurality of filters associated with each candidate filter combination. The computer system may identify (e.g., via the filter scoring module 270), for the plurality of filters associated with each candidate filter combination, a level of relevance to the search query, e.g., by comparing attributes associated with the plurality of filters and attributes associated with the search query. The computer system may obtain (e.g., via the filter scoring module 270) the set of features for the plurality of filters associated with each candidate filter combination using the extracted information about the engagement and the identified level of relevance.

The computer system may retrieve, from the database, engagement data for a collection of users of the computer system in relation to a collection of search queries entered by the collection of users via user interfaces of devices associated with the collection of users (e.g., user client devices 100). The computer system may extract (e.g., via the machine-learning training module 230), from the engagement data, interaction data with information about an engagement by each user from the collection of users with UI elements associated with a set of filters selected from the collection of filters for presentation to each user from the collection of users. The computer system may generate (e.g., via the machine-learning training module 230) a set of labels using the interaction data. The computer system may generate (e.g., via the machine-learning training module 230) training data including the set of labels. The computer system may train (e.g., via the machine-learning training module 230), using the training data, the filter scoring machine-learning model to generate a set of initial values for a set of parameters of the filter scoring machine-learning model.

The computer system may set (e.g., via the machine-learning training module 230) a label from the set of labels to be equal to one, when a plurality of UI elements (e.g., pair of UI elements) associated with a plurality of filters (e.g., pair of filters) from the set of filters were selected by each user from the collection of users. The computer system may set (e.g., via the machine-learning training module 230) the label to be equal to zero, when at most one of the plurality of UI elements was selected by each user from the collection of users.

The computer system may generate (e.g., via the machine-learning training module 230) a first likelihood of conversion by each user from the collection of users when each user selects only a first UI element associated with a first filter of a plurality of filters (e.g., pair of filters) from the set of filters. The computer system may generate (e.g., via the machine-learning training module 230) a second likelihood of conversion by each user from the collection of users when each user selects only a second UI element associated with a second filter of the plurality of filters from the set of filters. The computer system may set (e.g., via the machine-learning training module 230) a label from the set of labels to be equal to a product of the first likelihood and the second likelihood.

The computer system may generate (e.g., via the machine-learning training module 230) a likelihood of conversion by each user from the collection of users when each user selects all UI elements (e.g., both UI elements) associated with a plurality of filters (e.g., pair of filters) from the set of filters. The computer system may set (e.g., via the machine-learning training module 230) a label from the set of labels to be equal to the likelihood of conversion.

The computer system selects 540 (e.g., via the filter selection module 280), using the score for each candidate filter combination from the set of candidate filter combinations, a set of filter combinations. In one or more embodiments, the computer system generates (e.g., via the filter scoring module 270), using the engagement data for the user, a likelihood of conversion by the user when a UI element associated with a single filter from each candidate filter combination is selected. In such cases, the computer system may compare (e.g., via the filter selection module 280) the score for each candidate filter combination with the likelihood of conversion. Based on whether the score for each candidate filter combination meets or exceeds the likelihood of conversion, the computer system may select the set of filter combinations by including (e.g., via the filter selection module 280) each candidate filter combination in the set of filter combinations.

In one or more other embodiments, the computer system generates (e.g., via the filter scoring module 270), using the engagement data for the user, a likelihood of engagement by the user only with a UI element associated with a single filter from each candidate filter combination. In such cases, the computer system may compare (e.g., via the filter selection module 280) the score for each candidate filter combination with the likelihood of engagement. Based on whether the score for each candidate filter combination meets or exceeds the likelihood of conversion, the computer system may select the set of filter combinations by including (e.g., via the filter selection module 280), based on the comparison, each candidate filter combination in the set of filter combinations.

The computer system generates 545 (e.g., via the content presentation module 210), based at least in part on the selected set of filter combinations and the set of search results, a UI signal. The computer system sends 550 (e.g., via the content presentation module 210), via the network, the UI signal to the device associated with the user, wherein the sending causes the device associated with the user to display the UI with a set of UI elements along with the set of search results, each UI element from the set of UI elements having a functionality of a respective filter combination from the selected set of filter combinations for filtering the set of search results when each UI element is selected by the user.

The computer system may receive (e.g., via the machine-learning training module 230), from the device associated with the user and via the network, feedback data with information about an interaction by the user with the set of UI elements and an engagement by the user with the item (e.g., conversion of the item, only viewing product details without converting on the item, etc.). The computer system may re-train the filter scoring machine-learning model by updating (e.g., via the machine-learning training module 230), using the feedback data, a set of parameters of the filter scoring machine-learning model.

Embodiments of the present disclosure are directed to the computer system (e.g., the online system 140) that uses a trained machine-learning model to generate a user interface with combined filters that are personalized for a given user of the computer system. The computer system runs the trained machine-learning model to score and select combined filters to use in connection with a search results page.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:
    obtaining, by the computer system, a collection of filters, each filter from the collection of filters having a respective functionality for filtering search results;
    receiving, at the computer system, a search query entered via a user interface (UI) of a device associated with a user of the computer system;
    generating, using the received search query, a set of search results;
    responsive to the received search query, obtaining a set of features for the user;
    generating, based at least in part on the set of features for the user, a set of candidate filter combinations, each candidate filter combination from the set of candidate filter combinations having combined functionalities of a plurality of filters from the collection of filters;
    accessing a filter scoring machine-learning model that is trained to predict, for each candidate filter combination from the set of candidate filter combinations, an engagement likelihood for the user or a conversion likelihood for the user, wherein the engagement likelihood for the user is a likelihood that, given selection by the user of a first UI element having a functionality of a first filter of the plurality of filters, the user will select a second UI element having a functionality of a second filter of the plurality of filters, and the conversion likelihood for the user is a likelihood that, given selection by the user of the first UI element and the second UI element, the user will convert on an item from the set of search results;
    applying the filter scoring machine-learning model to the set of features for the user, a set of features of the search query, and a set of features for the plurality of filters associated with each candidate filter combination to generate a score for each candidate filter combination from the set of candidate filter combinations that is indicative of the engagement likelihood for the user or the conversion likelihood for the user;
    selecting, using the score for each candidate filter combination from the set of candidate filter combinations, a set of filter combinations personalized for the user that are the most likely to be used by the user among the set of candidate filter combinations;
    generating, based at least in part on the selected set of filter combinations and the set of search results, a UI signal; and
    sending, via a network, the UI signal to the device associated with the user, wherein sending the UI signal causes the device associated with the user to display the UI with a set of UI elements personalized for the user along with the set of search results, each UI element from the set of UI elements having a functionality of a respective filter combination from the selected set of filter combinations for filtering the set of search results when each UI element is selected by the user, for generating a refined set of search results using the functionality of the respective filter combination, and for updating the UI to display the refined set of search results.

2. The method of claim 1, wherein obtaining the set of features for the user comprises:
    retrieving, from a database of the computer system, engagement data for the user; and
    extracting, from the engagement data, at least one of information about a previous engagement by the user with the collection of filters, information about attributes of a collection of items converted by the user, or information about attributes related to a collection of search queries entered by the user.

3. The method of claim 1, further comprising:
    generating a prompt for input into a language model, the prompt including a list of items from the set of search results, information about a persona of the user, and a request for generating a response that includes a list of item attributes personalized for the user; and
    requesting the language model to generate, based on the prompt input into the language model, the response that includes the list of item attributes,
    wherein generating the set of candidate filter combinations comprises generating, further based on the list of item attributes, the set of candidate filter combinations.

4. The method of claim 1, wherein generating the set of candidate filter combinations comprises:
    retrieving, from a database of the computer system, engagement data for the user;
    extracting, from the engagement data, instances of a set of pluralities of filters from the collection of filters such that UI elements associated with each plurality of filters from the set of pluralities of filters were co-selected by the user; and
    generating, further using the instances of the set of pluralities of filters, the set of candidate filter combinations.

5. The method of claim 1, further comprising:
    receiving, from the device associated with the user and via the network, query data with information about the set of features of the search query including at least one of one or more categories of one or more items from the set of search results, an indication about an intent of the user in relation to the search query, or one or more attributes of the one or more items.

6. The method of claim 1, further comprising:
    retrieving, from a database of the computer system, engagement data for the user;
    extracting, from the engagement data, information about an engagement by the user with the plurality of filters associated with each candidate filter combination;
    identifying, for the plurality of filters associated with each candidate filter combination, a level of relevance to the search query; and
    obtaining the set of features for the plurality of filters associated with each candidate filter combination using the extracted information about the engagement and the identified level of relevance.

7. The method of claim 1, further comprising:
    retrieving, from a database of the computer system, engagement data for a collection of users of the computer system in relation to a collection of search queries entered by the collection of users via user interfaces of devices associated with the collection of users;
    extracting, from the engagement data, interaction data with information about an engagement by each user from the collection of users with UI elements associated with a set of filters selected from the collection of filters for presentation to each user from the collection of users;

generating a set of labels using the interaction data;

generating training data including the set of labels; and training, using the training data, the filter scoring machine-learning model to generate a set of initial values for a set of parameters of the filter scoring machine-learning model.

8. The method of claim 7, wherein generating the set of labels comprises:

setting a label from the set of labels to be equal to one, when a plurality of UI elements associated with a plurality of filters from the set of filters were selected by each user from the collection of users; and setting the label to be equal to zero, when at most one of the plurality of UI elements was selected by each user from the collection of users.

9. The method of claim 7, wherein generating the set of labels comprises:

generating a first likelihood of conversion by each user from the collection of users when each user selects only a first UI element associated with a first filter of a plurality of filters from the set of filters;

generating a second likelihood of conversion by each user from the collection of users when each user selects only a second UI element associated with a second filter of the plurality of filters from the set of filters; and setting a label from the set of labels to be equal to a product of the first likelihood and the second likelihood.

10. The method of claim 7, wherein generating the set of labels comprises:

generating a likelihood of conversion by each user from the collection of users when each user selects UI elements associated with a plurality of filters from the set of filters; and setting a label from the set of labels to be equal to the likelihood of conversion.

11. The method of claim 1, wherein selecting the set of filter combinations comprises:

retrieving, from a database of the computer system, engagement data for the user;

generating, using the engagement data, a likelihood of conversion by the user when a UI element associated with a single filter from each candidate filter combination is selected;

comparing the score for each candidate filter combination with the likelihood of conversion; and including, based on whether the score for each candidate filter combination meets or exceeds the likelihood of conversion, each candidate filter combination in the set of filter combinations.

12. The method of claim 1, wherein selecting the set of filter combinations comprises:

retrieving, from a database of the computer system, engagement data for the user;

generating, using the engagement data, a likelihood of engagement by the user only with a UI element associated with a single filter from each candidate filter combination;

comparing the score for each candidate filter combination with the likelihood of engagement; and including, based on whether the score for each candidate filter combination meets or exceeds the likelihood of conversion, each candidate filter combination in the set of filter combinations.

13. The method of claim 1, further comprising:

receiving, from the device associated with the user and via the network, feedback data with information about an interaction by the user with the set of UI elements and an engagement by the user with the item; and re-training the filter scoring machine-learning model by updating, using the feedback data, a set of parameters of the filter scoring machine-learning model.

14. A computer program product comprising a non-transitory computer readable storage medium having instructions encoded thereon that, when executed by a processor, cause the processor to perform steps comprising:

obtaining, by a computer system, a collection of filters, each filter from the collection of filters having a respective functionality for filtering search results;

receiving, at the computer system, a search query entered via a user interface (UI) of a device associated with a user of the computer system;

generating, using the received search query, a set of search results;

responsive to the received search query, obtaining a set of features for the user;

generating, based at least in part on the set of features for the user, a set of candidate filter combinations, each candidate filter combination from the set of candidate filter combinations having combined functionalities of a plurality of filters from the collection of filters;

accessing a filter scoring machine-learning model that is trained to predict, for each candidate filter combination from the set of candidate filter combinations, an engagement likelihood for the user or a conversion likelihood for the user, wherein the engagement likelihood for the user is a likelihood that, given selection by the user of a first UI element having a functionality of a first filter of the plurality of filters, the user will select a second UI element having a functionality of a second filter of the plurality of filters, and the conversion likelihood for the user is a likelihood that, given selection by the user of the first UI element and the second UI element, the user will convert on an item from the set of search results;

applying the filter scoring machine-learning model to the set of features for the user, a set of features of the search query, and a set of features for the plurality of filters associated with each candidate filter combination to generate a score for each candidate filter combination from the set of candidate filter combinations that is indicative of the engagement likelihood for the user or the conversion likelihood for the user;

selecting, using the score for each candidate filter combination from the set of candidate filter combinations, a set of filter combinations personalized for the user that are the most likely to be used by the user among the set of candidate filter combinations;

generating, based at least in part on the selected set of filter combinations and the set of search results, a UI signal; and sending, via a network, the UI signal to the device associated with the user, wherein sending the UI signal causes the device associated with the user to display the UI with a set of UI elements personalized for the user along with the set of search results, each UI element from the set of UI elements having a functionality of a respective filter combination from the selected set of filter combinations for filtering the set of search results when each UI element is selected by the user, for generating a refined set of search results using the functionality of the respective filter combination, and for updating the UI to display the refined set of search results.

15. The computer program product of claim 14, wherein the instructions further cause the processor to perform steps comprising:

retrieving, from a database of the computer system, engagement data for the user; and obtaining the set of features for the user by extracting, from the engagement data, at least one of information about a previous engagement by the user with the collection of filters, information about attributes of a collection of items converted by the user, or information about attributes related to a collection of search queries entered by the user.

16. The computer program product of claim 14, wherein the instructions further cause the processor to perform steps comprising:

retrieving, from a database of the computer system, engagement data for the user;

extracting, from the engagement data, instances of a set of pluralities of filters from the collection of filters such that UI elements associated with each plurality of filters from the set of pluralities of filters were co-selected by the user; and generating, further using the instances of the set of pluralities of filters, the set of candidate filter combinations.

17. The computer program product of claim 14, wherein the instructions further cause the processor to perform steps comprising:

retrieving, from a database of the computer system, engagement data for a collection of users of the computer system in relation to a collection of search queries entered by the collection of users via user interfaces of devices associated with the collection of users;

extracting, from the engagement data, interaction data with information about an engagement by each user from the collection of users with UI elements associated with a set of filters selected from the collection of filters for presentation to each user from the collection of users;

generating a set of labels using the interaction data;

generating training data including the set of labels; and training, using the training data, the filter scoring machine-learning model to generate a set of initial values for a set of parameters of the filter scoring machine-learning model.

18. The computer program product of claim 14, wherein the instructions further cause the processor to perform steps comprising:

retrieving, from a database of the computer system, engagement data for the user;

generating, using the engagement data, a likelihood of conversion by the user when a UI element associated with a single filter from each candidate filter combination is selected;

comparing the score for each candidate filter combination with the likelihood of conversion; and selecting the set of filter combinations by including, based on whether the score for each candidate filter combination meets or exceeds the likelihood of conversion, each candidate filter combination to the set of filter combinations.

19. The computer program product of claim 14, wherein the instructions further cause the processor to perform steps comprising:

retrieving, from a database of the computer system, engagement data for the user;

generating, using the engagement data, a likelihood of engagement by the user only with a UI element associated with a single filter from each candidate filter combination;

comparing the score for each candidate filter combination with the likelihood of engagement; and selecting the set of filter combinations by including, based on whether the score for each candidate filter combination meets or exceeds the likelihood of conversion, each candidate filter combination to the set of filter combinations.

20. A computer system comprising:

a processor; and a non-transitory computer-readable storage medium having instructions that, when executed by the processor, cause the computer system to perform steps comprising:

obtaining, by the computer system, a collection of filters, each filter from the collection of filters having a respective functionality for filtering search results;

receiving, at the computer system, a search query entered via a user interface (UI) of a device associated with a user of the computer system;

generating, using the received search query, a set of search results;

responsive to the received search query, obtaining a set of features for the user;

generating, based at least in part on the set of features for the user, a set of candidate filter combinations, each candidate filter combination from the set of candidate filter combinations having combined functionalities of a plurality of filters from the collection of filters;

accessing a filter scoring machine-learning model that is trained to predict, for each candidate filter combination from the set of candidate filter combinations, an engagement likelihood for the user or a conversion likelihood for the user, wherein the engagement likelihood for the user is a likelihood that, given selection by the user of a first UI element having a functionality of a first filter of the plurality of filters, the user will select a second UI element having a functionality of a second filter of the plurality of filters, and the conversion likelihood for the user is a likelihood that, given selection by the user of the first UI element and the second UI element, the user will convert on an item from the set of search results;

applying the filter scoring machine-learning model to the set of features for the user, a set of features of the search query, and a set of features for the plurality of filters associated with each candidate filter combination to generate a score for each candidate filter combination from the set of candidate filter combinations that is indicative of the engagement likelihood for the user or the conversion likelihood for the user;

selecting, using the score for each candidate filter combination from the set of candidate filter combinations, a set of filter combinations personalized for the user that are the most likely to be used by the user among the set of candidate filter combinations;

generating, based at least in part on the selected set of filter combinations and the set of search results, a UI signal; and sending, via a network, the UI signal to the device associated with the user, wherein sending the UI signal causes the device associated with the user to display the UI with a set of UI elements personalized for the user along with the set of search results, each UI element from the set of UI elements having a functionality of a respective filter combination from the selected set of filter combinations for filtering the set of search results when each UI element is selected by the user, for generating a refined set of search results using the functionality of the respective filter combination, and for updating the UI to display the refined set of search results.

\* \* \* \* \*